United States Patent
Fu

(10) Patent No.: US 11,022,217 B2
(45) Date of Patent: Jun. 1, 2021

(54) SHIFT-TYPE MULTI-PHASE-SHIFTER DRIVE TRANSMISSION DEVICE

(71) Applicant: NDK KUNSHAN CO., LTD., Jiangsu (CN)

(72) Inventor: Xiangya Fu, Jiangsu (CN)

(73) Assignee: NDK KUNSHAN CO., LTD., Jiangsu (CN)

( * ) Notice: Subject to any disclaimer, the term of this patent is extended or adjusted under 35 U.S.C. 154(b) by 131 days.

(21) Appl. No.: 16/467,944

(22) PCT Filed: Jan. 23, 2018

(86) PCT No.: PCT/CN2018/073731
§ 371 (c)(1),
(2) Date: Jun. 7, 2019

(87) PCT Pub. No.: WO2018/137594
PCT Pub. Date: Aug. 2, 2018

(65) Prior Publication Data
US 2019/0331220 A1 Oct. 31, 2019

(30) Foreign Application Priority Data
Jan. 24, 2017 (CN) .......................... 201710059712.4

(51) Int. Cl.
*F16H 63/30* (2006.01)
*F16H 37/02* (2006.01)

(52) U.S. Cl.
CPC ............. *F16H 63/30* (2013.01); *F16H 37/02* (2013.01); *F16H 2200/2002* (2013.01)

(58) Field of Classification Search
CPC .. F16H 63/30; F16H 37/02; F16H 2200/2002; F16H 25/2204; F16H 37/12; H01P 1/18; H01Q 3/32
See application file for complete search history.

(56) References Cited

U.S. PATENT DOCUMENTS 10,320,076 B2 * 6/2019 Fang ..................... H01Q 1/1264
2017/0373392 A1 * 12/2017 Kim ....................... H01Q 1/125

FOREIGN PATENT DOCUMENTS

CN 105720370 A * 6/2016
CN 205335430 U * 6/2016

OTHER PUBLICATIONS

English Translation of form PCT/ISA/237 for PCT/CN2018/073731 (Year: 2018).*

* cited by examiner

*Primary Examiner* — Victor L MacArthur

(57) ABSTRACT

A shift-type multi-phase-shifter drive transmission device includes a drive device (3), a shifting mechanism, multiple angle adjustment mechanisms and multiple ruler mechanisms. When the shift-type drive transmission device works, the drive device (3) firstly drives a shifting rack (11) of the shifting mechanism to move to a position which is corresponding to one of the angle adjustment mechanisms, a shifting bulge (111) on the shifting rack (11) is against a driving lever (13) for engaging an active clutch gear (16) with a passive clutch gear (17) of the corresponding angle adjustment mechanism, so as to further drive a transmission screw (19), thus a transmission nut (20) on the transmission screw (19) implements the reciprocating linear motion. The shift-type drive transmission device is able to drive multiple phase shifters through one drive device (3) to perform angle adjustment, which reduces an amount of the drive sources and effectively decreases cost.

9 Claims, 4 Drawing Sheets

SHIFT-TYPE MULTI-PHASE-SHIFTER DRIVE TRANSMISSION DEVICE

CROSS REFERENCE OF RELATED APPLICATION

This is a U.S. National Stage under 35 U.S.C 371 of the International Application PCT/CN2018/073731, filed Jan. 23, 2018, which claims priority under 35 U.S.C. 119(a-d) to CN 201710059712.4, filed Jan. 24, 2017.

BACKGROUND OF THE PRESENT INVENTION

Field of Invention

The present invention relates to the field of base station electrically adjusted antenna phase shifter technology, and more particularly to a shift-type drive transmission device for phase shifters.

Description of Related Arts

The base station electrically adjusted antenna system plays an important role in the mobile communication network. As a key component to realize the antenna electrically adjusted function, the phase shifter is the key research object of the electrically adjusted antenna. The phase shifter mainly uses a manual or electrical device as a drive source, and then uses a transmission mechanism to realize the phase shifting action, thereby achieving phase shifting. With the rapid development of the communication industry and the tightness of the installation of the tower resources, the base station's electrically adjusted antenna uses too many multi-frequency modes and the requirements for performance, volume, weight, reliability, cost, etc. are constantly improved. Therefore, it is important for the design requirements of the drive control device for the phase shifter.

The Chinese patent (Publication No.: CN 204303992U) discloses a base station antenna phase shifter adjusting device, comprising a first support block and a second support block fixed on an antenna reflection plate, wherein: a drive shaft is mounted on the second support block, a front end of the drive shaft is connected with a manual adjustment button for manually adjusting the electric downtilt angle, a rear end of the drive shaft is connected with a stop block, the stop block is supported by the first support block, a driven nut is sleeved outside the drive shaft, the drive shaft drives the driven nut to implement linear motion through external threads, the driven nut is fixedly connected with a ruler with scales, and the ruler passes through a ruler indicating block which is fixedly mounted on an antenna reflector.

At present, the design of the phase shifter transmission mechanism is too much in a one-to-one design mode, that is, a phase shifter requires a separate drive source, and the motor drive source and its control board need to be placed separately or collectively inside the antenna or are in a plug-in mode. These transmission methods have following problems. Firstly, the multi-frequency electrically adjusted antenna requires multiple motor drive sources, and the cost is high. If the motor drive sources are separately placed inside the antenna with control boards thereof, then they cannot be quickly repaired and replaced; and moreover, the internal power supply lines need to be connected in series, and the structure is complicated. If the motor drive sources are separately plugged and unplugged with control boards thereof, the power supply lines need to be connected in series outside the antenna, which is unfavorable for engineering and aesthetics. If a single motor drive source is placed separately and the control panel thereof is placed inside the antenna, rapid repair and replacement cannot be achieved, and the power supply lines need to be connected in series. If a single motor drive source is used separately and the control board assembly is plugged and unplugged, the drive source cannot be quickly repaired or replaced, and the internal power supply lines need to be connected in series. Moreover, the above methods cannot realize manual driving, and the design of the angle adjustment ruler is also difficult.

SUMMARY OF THE PRESENT INVENTION

In view of shortcomings of the prior art described above, an object of the present invention is to provide a shift-type drive transmission device which has a simple structure and adopts a drive source to drive multiple phase shifters.

To achieve the above object, the present invention provides a shift-type multi-phase-shifter drive transmission device, which comprises:

a drive device comprising a drive shaft and a shifting shaft both of which are for outwardly outputting power;

a shifting mechanism comprising a shifting gear and a shifting rack, wherein: the shifting gear is connected with the shifting shaft, the shifting rack is engaged with the shifting gear, a shifting bulge is set on the shifting rack, the shifting rack is able to move back and forth;

multiple angle adjustment mechanisms each of which comprises a transmission screw, a transmission nut, a clutch lever, a driving lever, an active clutch gear, and a passive clutch gear, wherein: the active clutch gear is connected with the driving lever, the driving lever is connected with the clutch lever, a shifting reset spring is connected with the driving lever or the clutch lever, both of the clutch lever and the driving lever are able to move back and forth along an axis of the clutch lever and the driving lever, the transmission screw is connected with the passive clutch gear, the transmission nut is located on the transmission screw, the active clutch gear is connected with the drive shaft of the drive device through a transmission mechanism, the shifting rack is opposite to the driving lever or the clutch lever of every angle adjustment mechanism, the active clutch gear is engaged with the passive clutch gear when the shifting bulge contacts with the driving lever or the clutch lever, the transmission nut is connected with a pull rod;

multiple ruler mechanisms, wherein: the angle adjustment mechanisms and the ruler mechanisms are in one-to-one correspondence with each other, each of the ruler mechanisms is configured to detect a position of the transmission nut; and a stand, wherein: all of the drive device, the shifting mechanism, the angle adjustment mechanisms and the ruler mechanisms are set on the stand.

Preferably, the drive device is an electric drive device or a manual drive device.

Preferably, the drive device is set at a middle portion of the stand, and the angle adjustment mechanisms and the ruler mechanisms are respectively set at two sides of the drive device.

Preferably, the transmission mechanism comprises a drive gear, a transmission gear and multiple middle gears, wherein: the drive shaft is connected with the drive gear, the drive gear is engaged with the middle gears through the transmission gear or is directly engaged with the middle gears, the active clutch gears of two adjacent angle adjustment mechanisms are engaged with each other through one of the middle gears.

Preferably, there are two to nine angle adjustment mechanisms and ruler mechanisms on the stand.

Preferably, the stand has an injection molding structure, a die casting structure or a machined forming structure.

Preferably, the passive clutch gear is connected with a shifting spring.

Preferably, the transmission nut has a guided limit hole, a guide block is set on the ruler and is corresponding to a position of the guided limit hole, the ruler is connected with a ruler reset spring.

Preferably, two shifting bulges are respectively set at two ends of the shifting rack, and a top of the shifting bulges is flat.

Preferably, a guide mechanism is set on a back of the shifting rack.

As mentioned above, the shift-type multi-phase-shifter drive transmission device provided by the present invention has beneficial effects as follows. The shift-type drive transmission device comprises a shifting mechanism and multiple angle adjustment mechanisms all of which are set on a stand. When the shift-type drive transmission device works, the drive device firstly drives the shifting rack of the shifting mechanism to move to a position which is corresponding to one of the angle adjustment mechanisms, the shifting bulge on the shifting rack is against the driving lever for engaging the active clutch gear with the passive clutch gear of the corresponding angle adjustment mechanism, so that the drive device is able to drive the active clutch gear and the passive clutch gear through a transmission mechanism to rotate, so as to further drive a transmission screw, thus a transmission nut on the transmission screw implements the reciprocating linear motion. The shift-type drive transmission device is able to drive multiple phase shifters through one drive device to perform angle adjustment, which reduces an amount of the drive sources and effectively decreases cost; and meanwhile, the shift-type drive transmission device has simple structure, is able to be modularly assembled, is more convenient to be repaired and replaced, and its appearance is more beautiful. There is no problem of stringing and the performance is more reliable. Moreover, in this way, the ruler can be adjusted manually, and the operation is simpler and more convenient.

Figure 1:
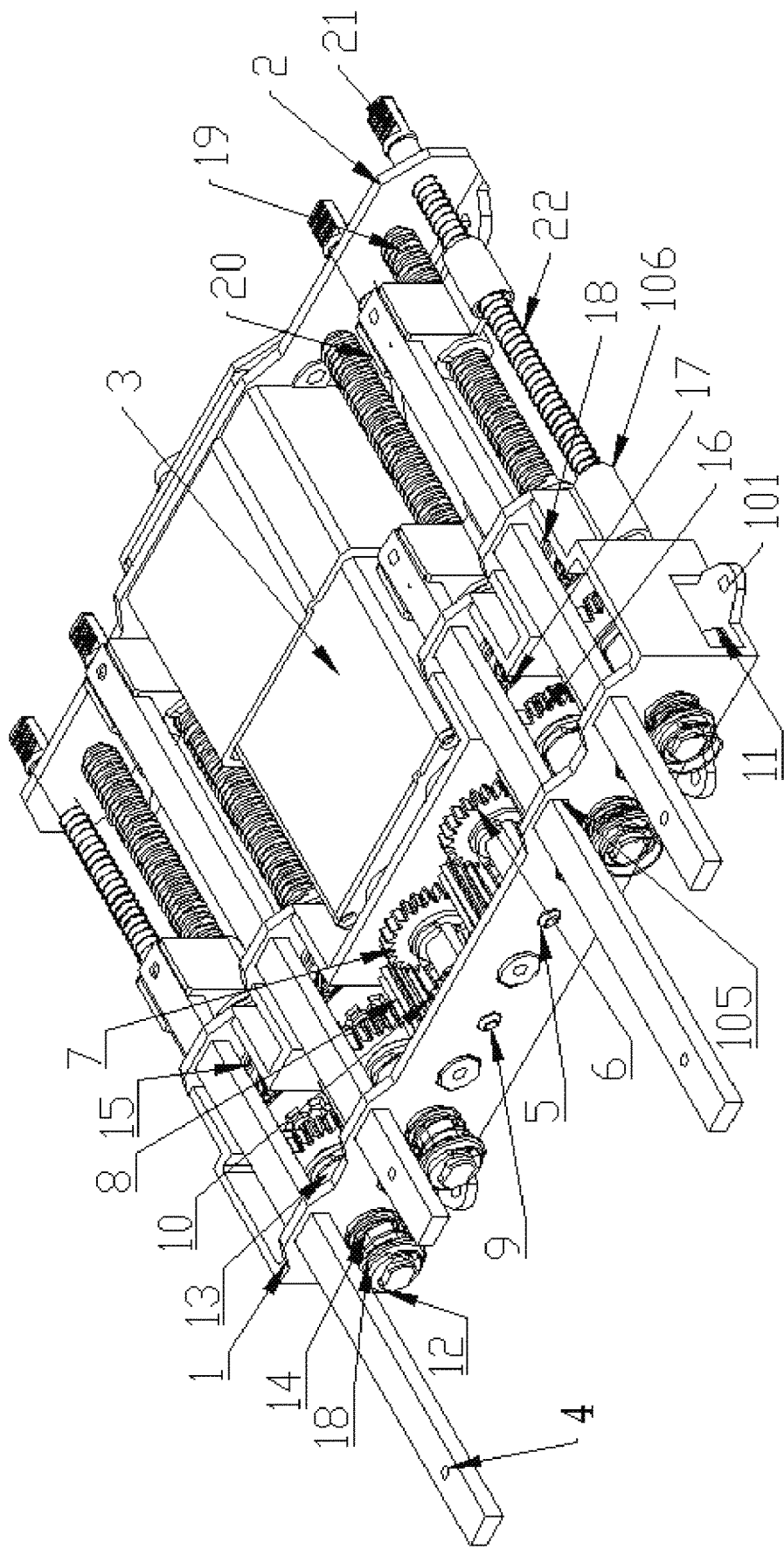
FIG. 1 is a front structurally schematic diagram of a shift-type multi-phase-shifter drive transmission device according to a preferred embodiment of the present invention.

In the drawings, 1: stand; 101: installation hole; 102: rack mounting guide groove; 104: transmission screw mounting hole; 105: pull rod hole; 106: ruler hole; 107: drive device positioning loss; 108: driving lever guide groove; 109: shifting rack mounting port; 110: stop ring mounting port; 2: stand side panel; 3: drive device; 4: pull rod; 5: drive shaft; 6: drive gear; 7: transmission gear; 8: middle gear; 9: shifting shaft; 10: shifting gear; 11: shifting rack; 111: shifting bulge; 12: clutch lever; 13: driving lever; 14: shifting reset spring; 15: shifting spring; 16: active clutch gear; 17: passive clutch gear; 18: spring pad; 19: transmission screw; 20: transmission nut; 21: ruler; 211: guide block; 22: ruler reset spring.

DETAILED DESCRIPTION OF THE PREFERRED EMBODIMENT

The present invention is described as below by way of specific embodiments, and those skilled in the art can readily understand other advantages and functions of the present invention from the disclosure.

Referring to FIGS. 1 to 4, it should be understood that the structures, the proportions, the sizes, and the like, which are illustrated in the drawings of the present specification, are only used to clarify the contents disclosed in the specification for being understood and read by those skilled in the art, and are not intended to limit the implementation of the present invention. Therefore, they have no technical significance. Any modification of the structure, change of the proportional relationship or adjustment of the size should fall within the scope of the technical content disclosed by the present invention without affecting the effects and the achievable objectives of the present invention. Meanwhile, the terms "upper", "lower", "left", "right", "intermediate" and "one" as used in the present specification are also for convenience of description, and are not intended to limit the present invention. The change or adjustment of the relative relationship of components is considered to be an implementable aspect of the present invention under the technical content without substantial change.

Figure 2:
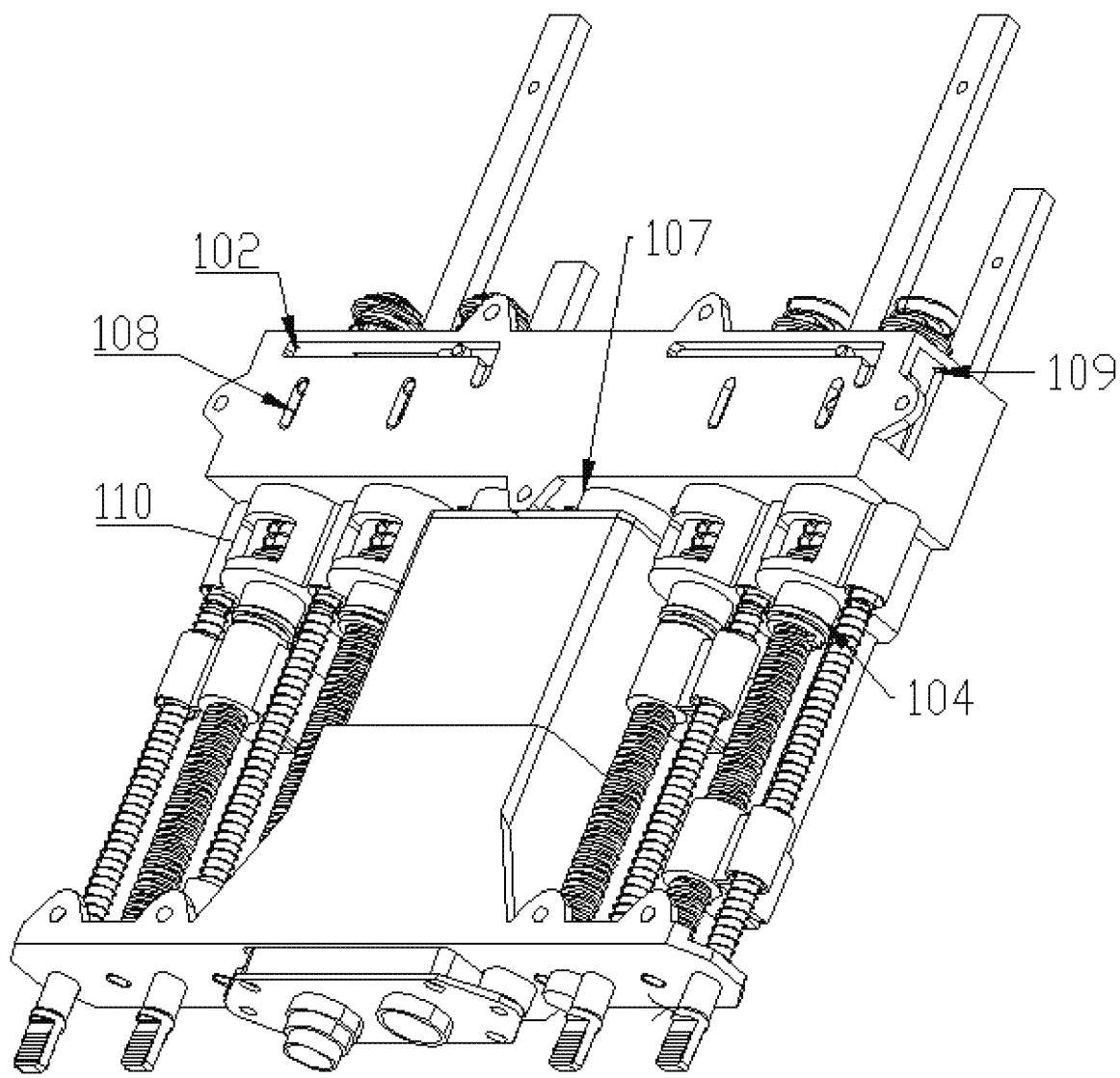
FIG. 2 is a back structurally schematic diagram of the shift-type multi-phase-shifter drive transmission device according to the above preferred embodiment of the present invention.

As shown in FIGS. 1 and 2, a shift-type multi-phase-shifter drive transmission device according to a preferred embodiment of the present invention is illustrated, which comprises a stand 1 which has a frame structure, two stand side panels 2 are respectively set at a front end and a rear end of the stand 1, the stand 1 has multiple installation holes 101 in a bottom thereof. The stand 1 is able to adopt an injection molding structure, a die casting structure or a machined forming structure. The stand side panels 2 are also not limited to the injection molding structure, and may be formed by metal die casting or machine sheet metal forming, or combined with an antenna connector mounting board. A drive device 3, which is set on the stand 1, is an electric drive device or a manual drive device. A drive device positioning loss 107 is set on the stand 1 for fixedly positioning the drive device 3. The drive device 3 comprises a drive shaft 5 and a shifting shaft 9 both of which are for outwardly outputting power.

Figure 3:
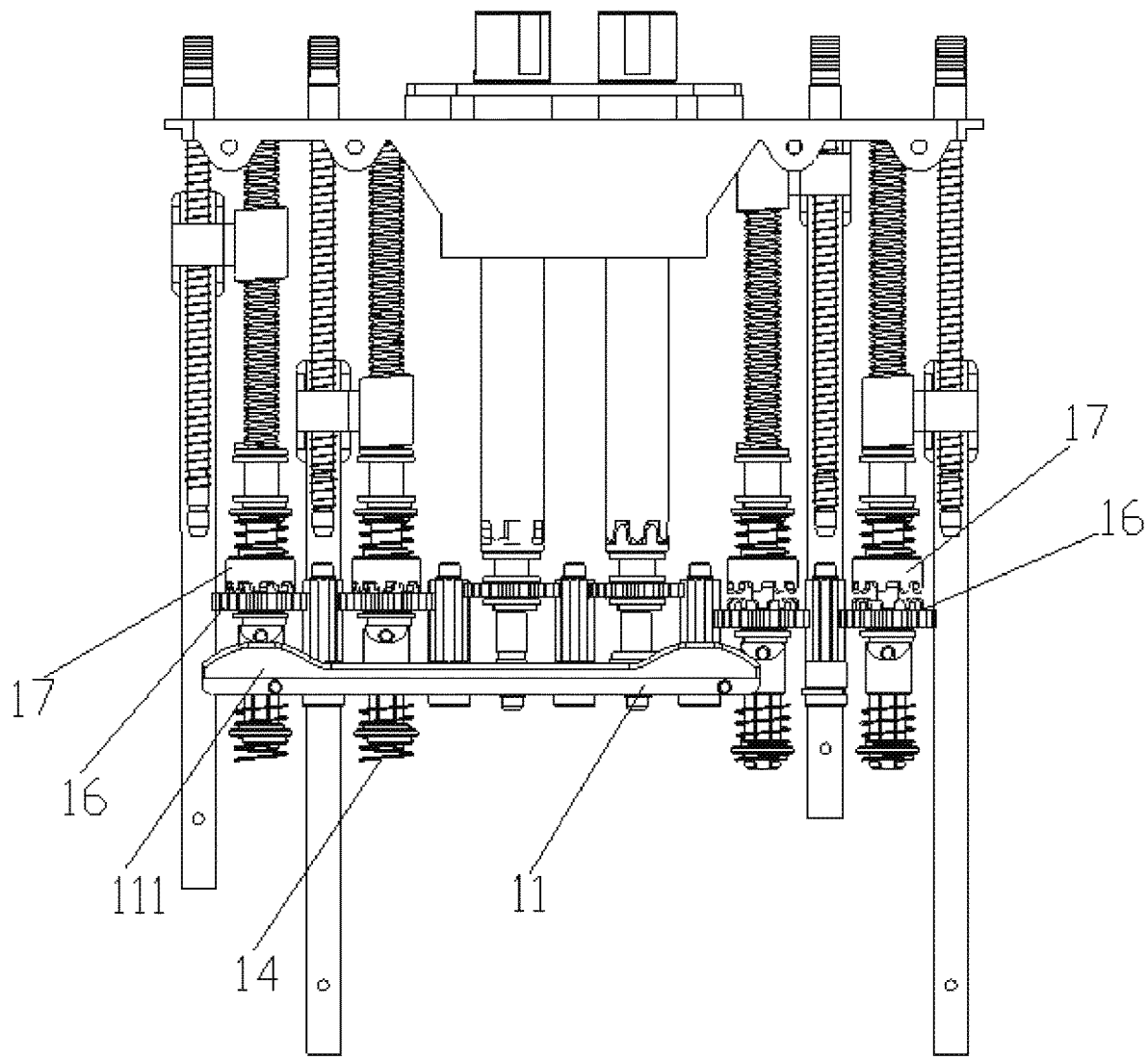
FIG. 3 is an installation structure diagram of a shifting rack of the shift-type multi-phase-shifter drive transmission device according to the above preferred embodiment of the present invention.

A shifting mechanism, which is set on the stand 1, comprises a shifting gear 10 and a shifting rack 11, wherein: the shifting gear 10 is connected with the shifting shaft 9, the shifting rack 11 is engaged with the shifting gear 10, the shifting gear 10 is installed within a rack mounting guide groove 102, a shifting rack positioning loss is also set within the rack mounting guide groove 102, the stand 1 has a shifting rack mounting port 109. A shifting bulge 111 is set on the shifting rack 11. The shifting rack 11 is able to move back and forth, A guide mechanism is set on a back of the shifting rack 11. Preferably, two shifting bulges 111 are respectively set at two ends of the shifting rack 11, a top of the shifting bulges 111 is flat, as shown in FIG. 3. When the shifting mechanism works, the shifting shaft 9 of the drive device 3 is driven to rotate, and then the shifting shaft 9 drives the shifting gear 10 to rotate, and then the shifting gear 10 drives the shifting rack 11 to implement reciprocating movement.

Multiple angle adjustment mechanisms and multiple ruler mechanisms are set on the stand 1, the angle adjustment mechanisms and the ruler mechanisms are in one-to-one correspondence with each other. Every adjustment mechanism comprises a transmission screw 19, a transmission nut 20, a clutch lever 12, a driving lever 13, an active clutch gear 16, and a passive clutch gear 17. The active clutch gear 16 is connected with the driving lever 13, the driving lever 13 is connected with the clutch lever 12, one end of the clutch lever 12 is located outside one of the stand side panels 2, a spring pad 18 is set at the end of the clutch lever 12, a shifting reset spring 14 is located between the spring pad 18 and one of the stand side panels 2. The shifting reset spring 14 is also able to be connected with the driving lever 13, and both of the clutch lever 12 and the driving lever 13 are able to move back and forth along an axis of the clutch lever 12 and the driving lever 13, so that the active clutch gear 16 is able to move back and forth along the axis of the clutch lever 12 and the driving lever 13. Every stand side panel 2 has a transmission screw mounting hole 104 for mounting the transmission screw, the transmission screw 19 is connected with the passive clutch gear 17, the transmission nut 20 is located on the transmission screw 19, the transmission screw 19 rotates to drive the transmission nut 20 to implement reciprocating movement in a straight line. The transmission nut 20 is connected with a pull rod 4, and every stand side panel 2 has a pull rod hole 105 which is corresponding to the pull rod 4, such that when the transmission nut 20 moves, the pull rod 4 is driven to move.

The active clutch gear 16 is connected with the drive shaft 5 of the drive device 3 through a transmission mechanism, and the drive shaft 5 drives the active clutch gear 16 of every angle adjustment mechanism to rotate through the transmission mechanism. The shifting rack 11 is opposite to the driving lever 13 of every angle adjustment mechanism. When the shifting rack 11 moves to a corresponding position, the shifting bulge 111 on the shifting rack 11 contacts with the driving lever 13 and moves inwardly against the driving lever 13, so as to engage the active clutch gear 16 with the passive clutch gear 17. To ensure that the driving lever 13 moves along a straight line, the driving lever 13 has a driving lever guide groove 108 at a bottom thereof. The shifting rack 11 is also able to be set at an end portion of the clutch lever 12 of every angle adjustment mechanism, so that when the shifting bulge 111 on the shifting rack 11 contacts with the clutch lever 12, the active clutch gear 16 is also engaged with the passive clutch gear 17. To ensure that the active clutch gear 16 is effectively engaged with the passive clutch gear 17, the passive clutch gear 17 is connected with a shifting spring 15, one end of the shifting spring 15 is against the passive clutch gear 17, and the other end of the shifting spring 15 is against a stop ring. The stand 1 has a stop ring mounting port 110.

Figure 4:
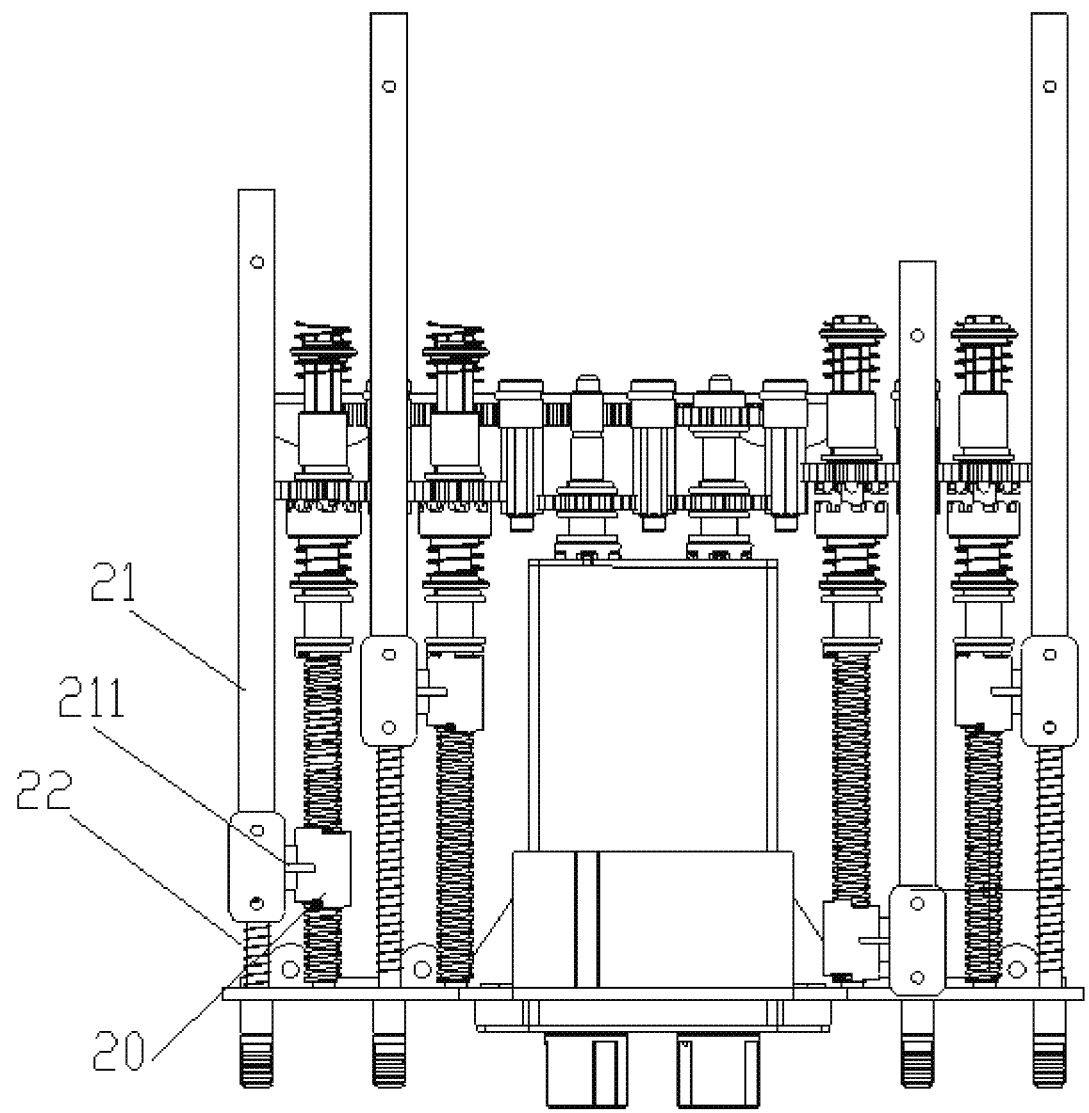
FIG. 4 is a connection schematic diagram of a ruler and a transmission nut of the shift-type multi-phase-shifter drive transmission device according to the above preferred embodiment of the present invention.

As shown in FIG. 4, every ruler mechanism, which is configured to detect a position of the transmission nut, comprises a ruler 21. Every stand side panel 2 has a ruler hole 106. Preferably, the transmission nut 20 has a guided limit hole, a guide block 211 is set on the ruler 21 and corresponding to a position of the guided limit hole, so that when the ruler 21 is pulled, due to the guided limit hole, once the guide block 211 is inserted into the guided limit hole, the ruler 21 is unable to continue to pull outwardly, thereby determining the position of the transmission nut 20. The ruler is connected with a ruler reset swing 22. Scales of the ruler 21 scale are based on a standard table on the stand 1, and the ruler is manually pull out and then is reset by the ruler reset spring 22.

Preferably, the drive device 3 is set at a middle portion of the stand 1, and every angle adjustment mechanism and every ruler mechanism are respectively set at two sides of the drive device 3. There are two to nine angle adjustment mechanisms and ruler mechanisms on the stand 1 as required. For every angle adjustment mechanism and every ruler mechanism, every stand side panel 2 has a corresponding transmission screw mounting hole 104, a pull rod hole 105 and a ruler hole 106.

The transmission mechanism for connecting the drive shaft 5 with the active clutch gear 16 is able to be any structure as required, as long as the drive shaft 5 is able to drive the active clutch gear 16 to rotate. Preferably, the transmission mechanism comprises a drive gear 6, a transmission gear 7 and multiple middle gears 8, wherein: the drive shaft 5 is connected with the drive gear 6, the drive gear 6 is engaged with the middle gears 8 through the transmission gear 7 or is directly engaged with the middle gears 8, the active clutch gears 16 of two adjacent angle adjustment mechanisms are engaged with each other through one of the middle gears 8. Also, the middle gears 8 are able to be removed, and a transmission is implemented through the transmission gear. Furthermore, the drive shaft is able to be combined with the shifting shaft, and the shifting shaft 9 is coaxially sleeved inside the drive shaft 5 of the drive device 3; of course, the shifting shaft 9 is able to be coaxially sleeved outside the drive shaft 5 of the drive device 3; the shifting shaft 9 and the drive shaft 5 respectively independently rotate from each other. The drive gear 6 and the shifting gear 10 are coaxially mounted and independently driven, which also falls within the protective scope of the present invention.

When the shift-type multi-phase-shifter drive transmission device provided by the present invention works, the shifting shaft 9 of the drive device 3 firstly drives the shifting gear 10 to rotate for further driving the shifting rack 11 to move, so that the shifting bulge 111 on the shifting rack 11 is against the driving lever 13 at the corresponding position, so as to engage the corresponding active clutch gear 16 with the corresponding passive clutch gear 17; and then the drive shaft 5 of the drive device 3 drives the active clutch gear 16 through the transmission mechanism, since only the active clutch gear 16 which is corresponding to the shifting bulge 111 at the position is engaged with the corresponding passive clutch gear 17, the active clutch gears 16 are not engaged with the passive clutch gears 17 of other angle adjustment mechanisms, such that the drive screw 19 on the corresponding angle adjustment mechanism is driven to rotate through the drive shaft, so as to further drive the transmission nut 20 and the pull rod 4 to move. As a result, through a power source, different commutators are driven to work. Moreover, through the ruler mechanism, the position of the transmission nut on every angle adjustment mechanism is determined, so as to further determine an angle of inclination of an antenna.

The shift-type drive transmission device comprises a shifting mechanism and multiple angle adjustment mechanisms all of which are set on a stand. When the shift-type drive transmission device works, the drive device firstly drives the shifting rack of the shifting mechanism to move to a position which is corresponding to one of the angle adjustment mechanisms, the shifting bulge on the shifting rack is against the driving lever for engaging the active clutch gear with the passive clutch gear of the corresponding angle adjustment mechanism, so that the drive device is able to drive the active clutch gear and the passive clutch gear through a transmission mechanism to rotate, so as to further drive a transmission screw, thus a transmission nut on the transmission screw implements the reciprocating linear motion. The shift-type drive transmission device is able to drive multiple phase shifters through one drive device to perform angle adjustment, which reduces an amount of the drive sources and effectively decreases cost; and meanwhile, the shift-type drive transmission device has simple structure, is able to be modularly assembled, is more convenient to being repaired and replaced, and its appearance is more beautiful. There is no problem of stringing and the performance is more reliable. Moreover, in this way, the ruler can be adjusted manually, and the operation is simpler and more convenient. Therefore, the present invention effectively overcomes various shortcomings in the prior art and has high industrial utilization value.

The above-described embodiments are merely illustrative of principles and effects of the present invention, and are not intended to limit the present invention. Modifications or variations of the above-described embodiments may be made by those skilled in the art without departing from the spirit and scope of the present invention. Therefore, all equivalent modifications or changes made by those skilled in the art without departing from the spirit and scope of the present invention are still covered by the appended claims.

What is claimed is:

1. A multi-phase-shifter drive transmission device, which comprises:
   a drive device comprising a drive shaft and a shifting shaft both of which are for outwardly outputting power;
   a shifting mechanism comprising a shifting gear and a shifting rack, wherein: the shifting gear is connected with the shifting shaft, the shifting rack is engaged with the shifting gear, a shifting bulge is set on the shifting rack, the shifting rack is able to move back and forth;
   multiple angle adjustment mechanisms each of which comprises a transmission screw, a transmission nut, a clutch lever, a driving lever, an active clutch gear, and a passive clutch gear, wherein: the active clutch gear is connected with the driving lever, the driving lever is connected with the clutch lever, a shifting reset spring is connected with the driving lever or the clutch lever, both of the clutch lever and the driving lever are able to move back and forth along an axis of the clutch lever and the driving lever, the transmission screw is connected with the passive clutch gear, the transmission nut is located on the transmission screw, the active clutch gear is connected with the drive shaft of the drive device through a transmission mechanism, the shifting rack is opposite to the driving lever or the clutch lever of every angle adjustment mechanism, the active clutch gear is engaged with the passive clutch gear when the shifting bulge contacts with the driving lever or the clutch lever, the transmission nut is connected with a pull rod;
   multiple ruler mechanisms, wherein: the angle adjustment mechanisms and the ruler mechanisms are in one-to-one correspondence with each other; and
   a stand, wherein: all of the drive device, the shifting mechanism, the angle adjustment mechanisms and the ruler mechanisms are set on the stand.

2. The multi-phase-shifter drive transmission device, as recited in claim 1, wherein: the drive device is an electric drive device or a manual drive device.

3. The multi-phase-shifter drive transmission device, as recited in claim 1, wherein: the drive device is set at a middle portion of the stand, and the angle adjustment mechanisms and the ruler mechanisms are respectively set at two sides of the drive device.

4. The multi-phase-shifter drive transmission device, as recited in claim 1, wherein: the transmission mechanism comprises a drive gear, a transmission gear and multiple middle gears, wherein: the drive shaft is connected with the drive gear, the drive gear is engaged with the middle gears through the transmission gear or is directly engaged with the middle gears, the active clutch gears of two adjacent angle adjustment mechanisms are engaged with each other through one of the middle gears.

5. The multi-phase-shifter drive transmission device, as recited in claim 1, wherein: there are two to nine angle adjustment mechanisms and ruler mechanisms on the stand.

6. The multi-phase-shifter drive transmission device, as recited in claim 1, wherein: the stand has an injection molding structure, a die casting structure or a machined forming structure.

7. The multi-phase-shifter drive transmission device, as recited in claim 1, wherein: the passive clutch gear is connected with a shifting spring.

8. The multi-phase-shifter drive transmission device, as recited in claim 1, wherein: two shifting bulges are respectively set at two ends of the shifting rack, and a top of the shifting bulges is flat.

9. The multi-phase-shifter drive transmission device, as recited in claim 1, wherein: the shifting shaft is coaxially sleeved inside the drive shaft of the drive device, or the shifting shaft is coaxially sleeved outside the drive shaft of the drive device, the shifting shaft and the drive shaft respectively independently rotate from each other.

* * * * *